(12) United States Patent
Tateyama

(10) Patent No.: US 7,969,852 B2
(45) Date of Patent: Jun. 28, 2011

(54) OPTICAL PICKUP APPARATUS

(75) Inventor: Kiyono Tateyama, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 439 days.

(21) Appl. No.: 12/294,604

(22) PCT Filed: Mar. 12, 2007

(86) PCT No.: PCT/JP2007/054819
§ 371 (c)(1),
(2), (4) Date: Sep. 25, 2008

(87) PCT Pub. No.: WO2007/113995
PCT Pub. Date: Oct. 11, 2007

(65) Prior Publication Data
US 2009/0207716 A1    Aug. 20, 2009

(30) Foreign Application Priority Data

Mar. 30, 2006  (JP) ................................. 2006-092856

(51) Int. Cl.
*G11B 7/00* (2006.01)
(52) U.S. Cl. ......... 369/112.24; 369/112.13; 369/112.26; 369/112.23
(58) Field of Classification Search .................. None
See application file for complete search history.

(56) References Cited

U.S. PATENT DOCUMENTS

| | | | | |
|---|---|---|---|---|
| 7,460,459 B2 * | 12/2008 | Nomura et al. | .......... | 369/112.13 |
| 2005/0068881 A1 * | 3/2005 | Kimura et al. | .......... | 369/112.23 |
| 2006/0198279 A1 * | 9/2006 | Kurogama et al. | ...... | 369/112.24 |

FOREIGN PATENT DOCUMENTS

| | | |
|---|---|---|
| JP | 11-045447 | 2/1999 |
| JP | 2000-056216 | 2/2000 |
| JP | 2005-141800 | 6/2005 |
| JP | 2005-293765 | 10/2005 |
| JP | 2005-317168 | 11/2005 |

* cited by examiner

*Primary Examiner* — Joseph Haley
(74) *Attorney, Agent, or Firm* — Cohen Pontani Lieberman & Pavane LLP

(57) ABSTRACT

An optical pickup apparatus includes: a first light source; a second light source; a light-converging optical system including a coupling lens and an objective lens; and a photodetector. The optical pickup apparatus is capable of recording and/or reproducing information by converging a light flux from each of the first and second light sources with the light-converging optical system on an information recording surface of each of first and second optical information recording media through a protective layer, and by detecting the light flux reflected from the information recording surface and passing through the light-converging optical system again, on the photodetector. The optical pickup apparatus satisfies predetermined conditions according to an optical path length from each of first and second light sources and the information recording medium, a magnification of the objective lens, and a magnification of the light-converging optical system.

22 Claims, 1 Drawing Sheet

OPTICAL PICKUP APPARATUS

RELATED APPLICATIONS

This is a U.S. National Phase Application under 35 USC 371 of International Application PCT/JP2007/054819 filed on Mar. 12, 2007.

This application claims the priority of Japanese application no. 2006-092856 filed Mar. 30, 2006, the entire content of which is hereby incorporated by reference.

TECHNICAL FIELD

The present invention relates to an optical pickup apparatus, and in particular, to an optical pickup apparatus capable of conducting recording and/or reproducing of information compatibly for different optical information recording media.

BACKGROUND ART

In recent years, there have been made rapid advances in research and development of a high density optical disc system capable of conducting recording and/or reproducing of information (hereinafter, "recording and/or reproducing" will be described as "recording/reproducing") by using a violet semiconductor laser having a wavelength of about 400 nm. As an example, in an optical disc conducting information recording/reproducing under the specifications of NA 0.85 and light source wavelength of 405 nm, the so-called Blu-ray Disc (hereinafter referred to as BD), recording of information of 23-27 GB per layer is possible for an optical disc with a diameter of 12 cm that is the same as DVD (NA 0.6, light source wavelength of 650 nm and memory capacity 4.7 GB) in terms of a size. In an optical disc conducting information recording/reproducing under the specifications of NA 0.65 and light source wavelength of 405 nm, the so-called HD DVD (hereinafter referred to as HD), recording of information of 15-20 GB per layer is possible for an optical disc with a diameter of 12 cm. In the present description, the optical discs of these kinds will be called "high density optical disc" hereinafter.

On the other hand, there is sometimes an occasion wherein products such as an optical disc player and a recorder (hereinafter, referred to as optical disc player/recorder) which can conduct recording/reproducing of information for only the high density optical disc are not sufficient in terms of a value. When considering the fact that DVD and CD (compact disc) storing various types of information are on the market presently, a commercial value as an optical disc player/recorder for a high density optical disc is enhanced by making it possible to conduct recording/reproducing of information equally and properly also for DVD and CD already owned by users, for example. From this background, an optical pickup apparatus carried by an optical disc player/recorder for a high density optical disc is required to have capability to conduct recording/reproducing of information properly for a high density optical disc and also for DVD and CD.

In this case, as a method to be capable of conducting recording/reproducing of information properly while keeping compatibility even for a high density optical disc, DVD and CD, there is considered a method that selectively switches optical systems for a high density optical disc and that for DVD and CD, depending on recording density of an optical disc for recording/reproducing of information. It is disadvantageous for downsizing and increases cost, because a plurality of optical systems are needed.

Therefore, for simplifying the structure of an optical pickup apparatus and thereby for achieving its low cost, it is preferable to employ a common element for an optical system for high density optical systems and an optical system for DVD and CD as far as possible and thereby to reduce the number of optical parts constituting the optical pickup apparatus, even for an optical pickup apparatus having the compatibility. Further, it is most advantageous for simplification of the structure and its low cost for the optical pickup apparatus, to employ a common objective lenses arranged to face an optical disc. In addition, there is also a demand to employ a common photodetector receiving reflected light fluxes coming from optical discs.

In contrast to this, Patent Document 1 (Unexamined Japanese Patent Application Publication No. 2005-141800) discloses an optical pickup apparatus wherein a common objective lens is employed by inserting a divergent-angle changing element in an optical path where a light flux for DVD and a light flux for CD commonly pass.

DISCLOSURE OF THE INVENTION

Problems to be Solved by the Invention

However, the optical pickup apparatus in the Patent Document 1 is equipped with a coupling lens and an objective lens through which light fluxes for DVD and CD commonly pass, and a photodetector that receives reflected light fluxes coming from DVD and CD. Though a distance from a light source to an optical disc (surface on the light source side) in the case of using DVD agrees with a distance from a light source to an optical disc (surface on the light source side) in the case of using CD, there are formed convergent spots each being different in size on a light-receiving surface of a photodetector due to the magnification difference of light-converging optical system including a coupling lens and an objective lens. It requires special solution on the photodetector side, which is not considered in the document. Namely, the optical pickup apparatus in the Patent Document 1 has a problem that special processing is needed for signal processing in the case of receiving the light fluxes on the same photodetector.

The present invention has been achieved in view of the aforesaid problems in prior art, and an object of the present invention is to provide an optical pickup apparatus wherein a load on the photodetector is less and recording/reproducing of information can be conducted properly for different optical information recording media, while employing a common objective lens, a common coupling lens and a common photodetector.

Means to Solve the Problems

An embodiment of the present invention is an optical pickup apparatus comprising: a first light source emitting a light flux with a wavelength $\lambda 1$ (nm); a second light source emitting a light flux with a wavelength $\lambda 2$ (nm), where $\lambda 1 < \lambda 2$; a light-converging optical system comprising a coupling lens and an objective lens; and a photodetector. The optical pickup apparatus is capable of recording and/or reproducing information by converging a light flux from the first light source with the light-converging optical system on an information recording surface of a first optical information recording medium through a protective layer with a thickness of t1, and by detecting a reflected light flux from the information recording surface on the photodetector after the reflected light flux passes through the light-converging optical system again. The optical apparatus is capable of recording and/or reproducing information by converging a light flux from the second light source with the light-converging optical system on an information recording surface of a second optical information recording medium through a protective layer with a thickness of t2 (t1≦t2), and by detecting a reflected light flux from the information recording surface on the photodetector when the reflected light flux passes through the light-converging system again. The optical pickup apparatus satisfies following expressions (1), (2), and (3).

$$0 \leq |L1-L2| \leq 0.5 \quad (1)$$

$$0.01 < m1-m2 \quad (2)$$

$$0 \leq |M1-M2| \leq 0.1 \quad (3)$$

In these expressions, L1 (mm) is an optical path length from the first light source to a surface facing the first light source in the first optical information recording medium, L2 (mm) is an optical path length from the second light source to a surface facing the second light source in the second optical information recording medium, m1 is an optical system magnification of the objective lens when information for the first optical information recording medium is recorded and/or reproduced, m2 is an optical system magnification of the objective lens when information for the second optical information recording medium is recorded and/or reproduced, M1 is a total optical system magnification of the Light-converging optical system when information for the first optical information recording medium is recorded and/or reproduced, and M2 is a total optical system magnification of the light-converging optical system when information for the second optical information recording medium is recorded and/or reproduced.

According to the embodiment, it is possible to easily provide all of the objective lens, the coupling lens and the photodetector each commonly used, by causing optical path lengths each which extends from a light source to the surface on the objective lens side in the optical information recording medium corresponding to the light source, to agree mostly with others so that expression (1) may be satisfied; by causing an optical system magnification of the objective lens to be different depending on light source wavelengths so that expression (2) may be satisfied; and by causing overall optical system magnification of the converging optical system including the coupling lens and the objective lens for each wavelength to agree mostly with others so that expression (3) may be satisfied. In this case, it is preferable that the number of photodetectors is one. The number of light-receiving sections in the photodetector may be plural. Alternatively, the photodetector may be one wherein a single light-receiving section is used by being divided into plural areas. Further, when light fluxes each having a different wavelength are received by the photodetector, a preferable embodiment is that the light-receiving section receives the light fluxes at different positions therein, but it is more preferable that the light-receiving section receives the light fluxes at the same position, from viewpoints of simplification and downsizing in circuit structure or of reduction of erroneous detection that light-receiving is conducted at the same position on the light-receiving section. Meanwhile, "coupling lens" means an optical element having positive refractive power arranged in an optical path from the first light source to the objective lens and in an optical path from the second light source to the objective lens. Further, "light-converging optical system" means an optical system having light-converging functions converging light from the light source to the optical information recording medium, and it does not include a light-converging optical element which is arranged on a position closer than the photodetector and through which light does not pass before traveling along the returning optical path (namely, through which light traveling from the light source to an optical information recording medium does not pass).

In the above embodiment, it is preferable that a power of the coupling lens for a light flux with the wavelength $\lambda 1$ and a power of the coupling lens for a light flux with the wavelength $\lambda 2$ are different from each other. Thereby, the coupling lens can emit light which travels from the light source arranged at the same distance from the optical information recording media (the light-source side surface), as light whose divergent angle differs corresponding to a difference in optical system magnification of the objective lens represented by the expression (2).

In the above embodiment, it is preferable that the coupling lens comprises a first diffractive structure, and the light flux with the wavelength $\lambda 1$ and the light flux with the wavelength $\lambda 2$ pass the first diffractive structure.

By utilizing the first diffraction structure as a measure to change power of a coupling lens for light fluxes each having a different wavelength, the refractive power can be reduced, namely, curvature of the optical surface can be reduced. It can improve moldability of a coupling lens. Or, it is possible to correct a part or the whole of chromatic aberration of the overall optical system with a coupling lens. The coupling lens is smaller in a curvature of an optical surface and angles of light rays (incident/outgoing angle) than the objective lens. Therefore, it is possible to reduce a loss of quantity of light by providing a diffractive structure on the coupling lens rather than providing a diffractive structure on the objective lens.

In the above embodiment, it is preferable that the first diffractive structure has a function which controls a generation of a chromatic aberration at least for the light flux with the wavelength $\lambda 1$.

In the above embodiment, it is preferable that the first diffractive structure has an average step amount dCPL (μm) along an optical axis satisfying the following expression (4).

$$\lambda 1 \times 2/(n1-1) \times 1.0 \leq dCPL \leq \lambda 1 \times 2/(n1-1) \times 1.3 \quad (4)$$

In the expression, n1 is a refractive index of a material forming the first diffractive structure for the light flux with the wavelength $\lambda 1$.

When the aforesaid first diffractive structure is designed so that the expression (4) may be satisfied, utilization efficiency of each diffracted light can be increased as follows. In the case that the first optical information recording medium is a high density optical disc and the second optical information recording medium is DVD, the second-order diffracted light has the largest intensity as for a light flux with the wavelength $\lambda 1$, and the first-order diffracted light has the largest intensity as for a light flux with the wavelength $\lambda 2$, when each light flux passes through the first diffractive structure. In the case that the first optical information recording medium is DVD and the second optical information recording medium is a high density optical disc, the first-order diffracted light has the largest intensity as for a light flux with the wavelength $\lambda 1$, and the first-order diffracted light has the largest intensity as for a light flux with the wavelength $\lambda 2$, when each light flux passes through the first diffractive structure. Further, fluctuation of diffraction efficiency caused by changes in a wavelength and temperature can be reduced, because lower-order diffracted light is used. Meanwhile, average step amount dCPL means an average value of amount of all steps of diffractive structure within the area where both of the following light fluxes pass through one surface of the coupling lens: a light flux with wavelength $\lambda 1$ that passes through an area used for recording/ reproducing information for the first optical information recording medium; and a light flux with wavelength λ2 that passes through an area used for recording/reproducing information for the second optical information recording medium. It is preferable that this first diffractive structure is provided on one surface of the coupling lens. Further, in a more preferable embodiment, average step amount dCPL is equal to the value obtained by dividing the total sum of the amount of steps formed on one surface of the coupling lens by the number of the steps. In the coupling lens, it is preferable that a diffractive structure is formed also on an area where the light fluxes not used in a standard working condition pass through (on an outer portion of the area where the light fluxes used for recording/reproducing of information pass through). It is provided in order to cause a prescribed light coming from the coupling lens to enter the total area within an aperture diaphragm of the objective lens even when the objective lens is under the tracking operation, while the coupling lens is generally used with fixed in an optical pickup apparatus when recording/reproducing information. Therefore, it is preferable that the whole of the diffractive structure on the coupling lens is regarded as the first diffractive structure.

In the above embodiment, it is preferable that the first diffractive structure has a function which makes a difference between an optical system magnification of the coupling lens for the light flux with the wavelength λ1 and an optical system magnification of the coupling lens for the light flux with the wavelength λ2.

In the above embodiment, it is preferable that the coupling lens comprises a lens movable in a direction of an optical axis.

In the above embodiment, it is preferable that the coupling lens comprises a plurality of lenses including at least one lens located different position along an optical axis between when information of the first optical information recording medium is recorded and/or reproduced and when information of the second optical information recording medium is recorded and/or reproduced.

Due to this, it is possible to utilize the foregoing as a means to change the power of the coupling lens, depending on a wavelength of a light flux, namely, on an optical information recording medium subjected to recording/reproducing of information. Advantages of this means, which is recognized by a comparison with the diffractive structure that is also a means to change power in the same way, include that efficiency of utilization of light is high and it works without depending on a wavelength of a light flux, whereby the power can be changed optionally for only one wavelength. Further, when the first optical information recording medium is high density DVD and the second optical information recording medium is CD, a wavelength ratio is about 1:2, which makes it difficult to change power of the coupling lens with a diffractive structure. Therefore, the aforesaid measure is effective.

An example of employing a multiple-lens-structure coupling lens wherein at least one lens is made to be movable to change optical system magnification (power), will be shown below. In general, a magnification of an overall optical system of a converging optical system needs to be a predetermined value which makes recording/reproducing of information possible. When setting a distance from a light source to an optical information recording medium for a light flux with wavelength λ1 and a distance from a light source to an optical information recording medium for a light flux with wavelength λ2 to be the same, specifically, when one photodetector is shared by a light flux with wavelength λ1 and by a light flux with wavelength λ2, the total optical system magnification of the converging optical system need to be the same for the light flux with wavelength λ1 and the light flux with wavelength λ2, in other words, to be the same between when recording/reproducing information for the first optical information recording medium and when recording/reproducing information for the second optical information recording medium. Therefore, a coupling lens is constructed by plural lenses and a part of plural lenses are moved in the optical axis direction, so that power of the coupling lens is changed. That is, a part of lenses are moved in the optical axis direction so that the total optical system magnification of the converging optical system may be the same for the light flux with wavelength λ1 and for the light flux with wavelength λ2, thus, the power of the coupling lens is changed. Owing to this, when recording/reproducing information for each of the first optical information recording medium and the second optical information recording medium, it is possible to change optical system magnification (power) of the coupling lens, while keeping the total optical system magnification of the converging optical system to be constant.

In the above embodiment, it is preferable that the coupling lens consists of two lenses.

In the above embodiment, it is preferable that one of the two lenses of the coupling lens is movable along the optical axis and satisfies a following expression (5).

$$0.25 \leq (f_{1 \cdot CPL}/f_{2 \cdot CPL}) \times 1/f_{1 \cdot OBL} \leq 0.35 \quad (5)$$

In the expression, $f_{1 \cdot CPL}$ (mm) is a focal length of the coupling lens for the light flux with the wavelength λ1, $f_{2 \cdot CPL}$ (mm) is a focal length of the coupling lens for the light flux with the wavelength λ2, and $f_{1 \cdot OBL}$ (mm) is a focal length of the objective lens for the light flux with the wavelength λ1.

By satisfying expression (5), it is possible to cause the total optical system magnification of the light-converging optical system including a coupling lens and an objective lens to agree mostly among all wavelengths. For example, it is possible to make the total optical system magnification for a light flux with wavelength λ1 and the total optical system magnification for a light flux with wavelength λ2 to be equal by changing an optical system magnification of the coupling lens while keeping the objective lens to be the same (while keeping focal length and optical system magnification fixed values).

In the above embodiment, it is preferable that the wavelength λ1, the wavelength λ2, and a displacement amount of the coupling lens Dt1 (mm) satisfy the following expressions.

$$350 \leq \lambda 1 \leq 450 \quad (6)$$

$$600 \leq \lambda 2 \leq 700 \quad (7)$$

$$0.3 \leq Dt1 \leq 2 \quad (8)$$

Owing to this, the aforesaid photodetector can be commonly used for high density optical disc and DVD, for example. If the displacement amount Dt1 is not more than the upper limit value, it is possible to provide an optical pickup apparatus for space saving, while, if it is not lower than the lower limit value, sensitivity for movement of the coupling lens is lowered, and it is possible to employ a driving apparatus that has low accuracy for position and can be manufactured easily. Incidentally, it is assumed that "displacement amount of the coupling lens" mentioned in the present description means an amount of displacement in the optical axis direction between the position of the coupling lens in the case of recording or reproducing information for the first optical information recording medium and the position of the coupling lens in the case of recording or reproducing information for the second optical information recording medium.

Incidentally, when the coupling lens is composed of one lens, "a position of the coupling lens" indicates the position the one lens. When the coupling lens is composed of two lenses and a position of one of the aforesaid two lenses is displaced, "a position of the coupling lens" is assumed to indicate the position of the one lens displaced. Further, when the coupling lens is composed of plural lenses and some of the plural lenses or all of the plural lenses are displaced, "a position of the coupling lens" indicates a position of one lens having the greatest displacement amount.

In the above embodiment, it is preferable that the wavelength λ1, the wavelength λ2, and a displacement amount of the coupling lens Dt2 (mm) satisfy following expressions.

$$350 \leq \lambda 1 \leq 450 \quad (9)$$

$$700 \leq \lambda 2 \leq 800 \quad (10)$$

$$1 \leq Dt2 \leq 4 \quad (11)$$

Owing to this, the aforesaid photodetector can be commonly used for high density optical disc and CD, for example. If the displacement amount Dt2 is not more than the upper limit value, it is possible to provide an optical pickup apparatus for space saving, while, if it is not lower than the lower limit value, sensitivity for movement of the coupling lens is lowered, and it is possible to employ a driving apparatus that has low accuracy for position and can be manufactured easily.

In the above embodiment, it is preferable that the optical pickup apparatus further comprises: a third light source emitting a light flux with a wavelength λ3 (nm), where λ2<λ3. The optical pickup apparatus is capable of recording and/or reproducing information by converging a light flux from the third light source with the light-converging optical system on an information recording surface of a third optical information recording medium through a protective layer with a thickness of t3 (t2<t3). The objective lens comprises a second diffractive structure, and the light flux with the wavelength λ1 and the light flux with the wavelength λ2 pass through the second diffractive structure. The second diffractive structure has an average step amount dOBL (μm) along an optical axis satisfying a following expression (12).

In the expression, n2 is a refractive index of a material forming the second diffractive structure for the light flux with the wavelength λ1.

When the second diffractive structure is formed so that expression (12) may be satisfied, utilization efficiency of each diffracted light can be increased as follows. In the case that the first optical information recording medium is a high density optical disc and the second optical information recording medium is DVD, the second-order diffracted light has the largest intensity as for a light flux with the wavelength λ1, and the first-order diffracted light has the largest intensity as for a light flux with the wavelength λ2, when each light flux passes through the second diffractive structure. In the case that the first optical information recording medium is DVD and the second optical information recording medium is a high density optical disc, the first-order diffracted light has the largest intensity as for a light flux with the wavelength λ1, and the first-order diffracted light has the largest intensity as for a light flux with the wavelength λ2, when each light flux passes through the second diffractive structure. Further, fluctuation of diffraction efficiency caused by changes in a wavelength and temperature can be reduced, because lower-order diffracted light is used. Meanwhile, average step amount dOBL means an average value of amount of all steps of diffractive structure within the area where the light fluxes with respective wavelengths coming from different light sources and satisfying the expressions (1), (2) and (3) passes to be used for recording/reproducing information and where the light fluxes coming from different light sources commonly pass through. Therefore, in the optical pickup apparatus wherein light fluxes respectively with wavelengths λ1, λ2 and λ3 are used, for example, when a light flux with wavelength λ3 does not satisfy expressions (1), (2) and (3), average step amount dOBJ is an average value of amount of the steps of the diffractive structure within an area where light fluxes with wavelengths λ1 and λ2 which pass through an area used for respective recording/reproducing of information commonly pass through. While, in the optical pickup apparatus wherein light fluxes respectively with wavelengths λ1, λ2 and λ3 are used, when a light flux with wavelength λ3 satisfies expressions (1), (2) and (3), average step amount dOBJ is an average value of amount of the steps of the diffractive structure within an area where light fluxes with three wavelengths which pass through an area used for respective recording/reproducing information commonly pass through.

In the above embodiment, it is preferable that the optical pickup apparatus satisfies a following expression (13).

$$10 \leq L' \leq 25 \quad (13)$$

In the expression, L' (mm) is a distance (air space along an optical axis) for the light flux with the wavelength λ1 between the coupling lens and the objective lens.

In the above-embodiment, it is preferable that when the optical pickup apparatus further comprises a branching means branching away a light flux traveling from the optical information recording medium to the photodetector from a light flux traveling from the light source to the information recording medium, the coupling lens is arranged between the objective lens and the branching means. Thereby, the same coupling lens is utilized on the path of emitted light and the path of returning light, and it provides a compact and low-cost optical pickup apparatus.

In the above-embodiment, it is preferable that the photodetector consists of one element body, and the photodetector receives at least the light flux with the wavelength λ1 and the light flux with the wavelength λ2 at light-receiving sections arranged at a same position.

In the above-embodiment, it is preferable that the optical pickup apparatus satisfies a following expression.

In the expression, NA1 is a numerical aperture at an image side of the objective lens when information is recorded and/or reproduced for the first optical information recording medium, and NA2 is a numerical aperture at an image side of the objective lens when information is recorded and/or reproduced for the second optical information recording medium.

In the above-embodiment, it is preferable that the first optical information recording medium is HD DVD and the second optical information recording medium is DVD.

It is assumed that an objective lens mentioned in the present description means a lens having a light converging function and arranged to be closest to an optical information recording medium and to face it under the condition that the optical information recording medium is loaded on the optical pickup apparatus. Further, when there is an additional optical element or lens with a light converging function which is attached to an actuator driving the above lens and which is driven with the above lens as one body, it is assumed that an objective lens also means an optical element group further including the additional optical element or lens. In short, it is preferable that the objective lens is a single lens, but it may also be composed of plural lenses or of plural optical elements.

Effect of the Invention

The invention makes it possible to provide an optical pickup apparatus capable of recording/reproducing information properly for different optical information recording mediums, while employing a common objective lens, a common coupling lens and a common photodetector.

EXPLANATION OF NOTATION

Figure 1:
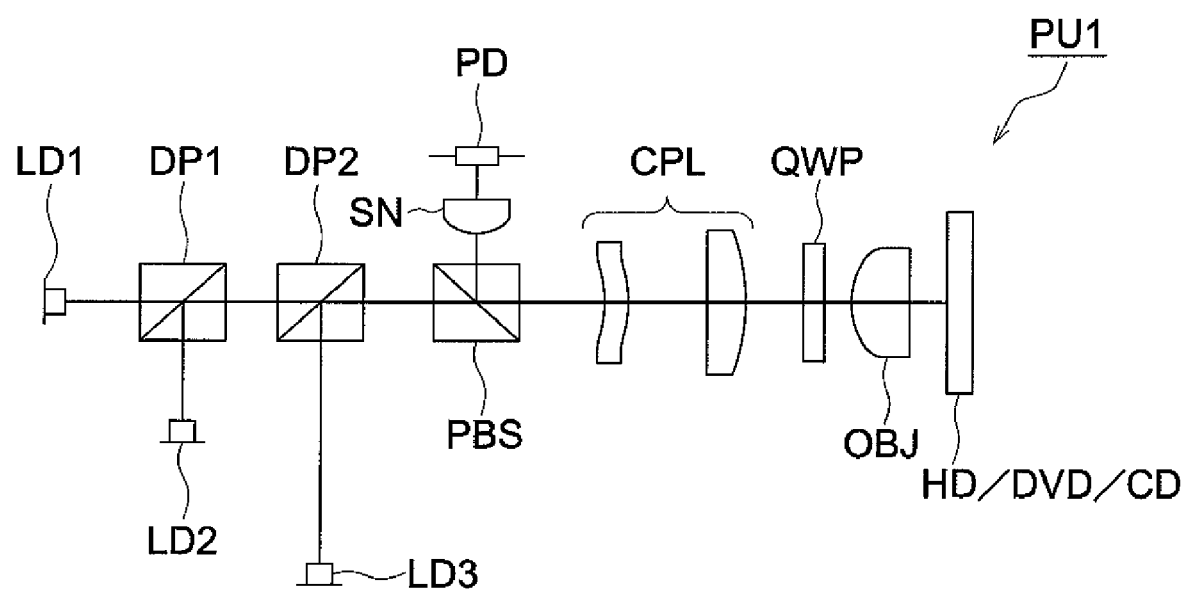
FIG. 1 is a diagram schematically showing the structure of optical pickup apparatus PU1 in the embodiment capable of recording/reproducing information properly for HD, DVD and CD representing different optical information recording media (which are also called optical discs).

CPL Coupling lens
DP1 First dichroic prism
DP2 Second dichroic prism
LD1 First semiconductor laser
LD2 Second semiconductor laser
LD3 Third semiconductor laser
OBJ Objective lens
PBS Polarizing beam splitter
PD Photodetector
PU1 Optical pickup apparatus
QWP λ/4 wavelength plate
SN Sensor lens

BEST MODE FOR CARRYING OUT THE INVENTION

An embodiment of the invention will be explained as follows, referring to the drawings. FIG. 1 is a diagram schematically showing the structure of optical pickup apparatus PU1 in the embodiment capable of recording/reproducing information properly for HD, DVD and CD representing different optical information recording media (which are also called optical discs). The optical pickup apparatus PU1 is mounted on an optical information recording and reproducing apparatus.

The optical pickup apparatus PU1 is composed of first semiconductor laser (first light source) LD1 that is driven and emits a violet laser light flux (first light flux) having wavelength λ1=406 nm when conducting recording/reproducing of information for HD representing a high density optical disc, second semiconductor laser (second light source) LD2 that is driven and emits a red laser light flux (second light flux) having wavelength λ2=660 nm when conducting recording/reproducing of information for DVD, third semiconductor laser (third light source) LD3 that is driven and emits a infrared laser light flux (third light flux) having wavelength λ3=783 nm when conducting recording/reproducing of information for CD, photodetector PD commonly used for HD/DVD/CD, coupling lens CPL, objective lens OBJ that is made of plastic and is a single lens having a prescribed diffractive structure and having a function to converge an incident laser light flux on an information recording surface, polarizing beam splitter PBS representing a branching means, first dichroic prism DP1, second dichroic prism DP2, λ/4 wavelength plate QWP and sensor lens SN for giving astigmatism to a reflected light flux from an optical disc. Incidentally, as a light source for HD, it is also possible to use a violet SHG laser in addition to the aforesaid semiconductor laser LD1.

In the present embodiment, coupling lens CPL is arranged to be movable in the optical axis direction corresponding to an optical disc to be used, and the outgoing angle is changed depending on a wavelength of the incident light flux by changing its position in the optical axis direction. In place of the foregoing, or in addition to the foregoing, a diffractive structure may be provided in the embodiment. Further, with respect to optical path length L1 between the first semiconductor laser LD1 and a surface of HD on the light source side, optical path length L2 between the second semiconductor laser LD2 and a surface of DVD on the light source side, and optical path length L3 between the third semiconductor laser LD3 and a surface of CD on the light source side, each of these optical path lengths is the same as others, or has a difference of 0.5 mm or less from the others.

In the optical pickup apparatus PU1, when conducting recording/reproducing of information for HD, first semiconductor laser LD1 is activated. A divergent light flux emitted from the first semiconductor laser LD1 passes through the first dichroic prism DP1, the second dichroic prism DP2 and polarizing beam splitter PBS, and then, is converted into convergent light flux by coupling lens CPL. The light flux further passes through λ/4 wavelength plate QWP to be regulated in terms of a light-flux diameter by an unillustrated diaphragm and becomes a spot formed on an information recording surface of HD by objective lens OBJ through a protective layer. The objective lens OBJ performs focusing and tracking operations by a biaxial actuator (not shown) arranged on the circumstance of the objective lens.

A light flux reflected and modulated on information pits on an information recording surface of HD passes again through objective lens OBJ and λ/4 wavelength plate QWP, and then, passes through coupling lens CPL. After that, the light flux is reflected by polarizing beam splitter PBS. Further, astigmatism is given to the light flux by sensor lens SN and the light flux is converged on a light-receiving surface of photodetector PD. Thus, information recorded on HD can be read by the use of output signals of photodetector PD.

Further, when conducting recording/reproducing of information for DVD in optical pickup apparatus PU1, second semiconductor laser LD2 is activated. A divergent light flux emitted from the second semiconductor laser LD2 is reflected by first dichroic prism DP1, and passes through second dichroic prism DP2 and polarizing beam splitter PBS. Then, the light flux is converted by coupling lens CPL into any one of: a parallel light flux; a convergent light flux whose convergent angle is smaller than that for the HD; and a divergent light flux whose divergent angle is smaller than that for CD which will be described later. The light flux further passes through λ/4 wavelength plate QWP to be regulated in terms of a light-flux diameter by an unillustrated diaphragm and becomes a spot formed on an information recording surface of DVD by objective lens OBJ through a protective layer. The objective lens OBJ performs focusing and tracking operations by a biaxial actuator (not shown) arranged on the circumstance of the objective lens.

A light flux reflected and modulated on information pits on an information recording surface of DVD passes again through objective lens OBJ and λ/4 wavelength plate QWP. Then, the light flux passes through coupling lens CPL and is reflected by polarizing beam splitter PBS. Further, astigmatism is given to the light flux by sensor lens SN and the light flux is converged on a light-receiving surface of photodetector PD. Thus, information recorded on DVD can be read by the use of output signals of photodetector PD.

Further, when conducting recording/reproducing of information for CD in optical pickup apparatus PU1, third semiconductor laser LD3 is activated. A divergent light flux emitted from the third semiconductor laser LD3 is reflected by second dichroic prism DP2, and passes through polarizing beam splitter PBS, and then, is converted by coupling lens CPL into a divergent light flux. The light flux further passes through λ/4 wavelength plate QWP to be regulated in terms of a light flux diameter by an unillustrated diaphragm and becomes a spot formed on an information recording surface of CD by objective lens OBJ through a protective layer. The objective lens OBJ performs focusing and tracking operations by a biaxial actuator (not shown) arranged on the circumstance of the objective lens.

A light flux reflected and modulated on information pits on an information recording surface of CD passes again through objective lens OBJ and λ/4 wavelength plate QWP, and then, passes through coupling lens CPL to be reflected by polarizing beam splitter PBS. Further, astigmatism is given to the light flux by sensor lens SN and the light flux is converged on a light-receiving surface of photodetector PD. Thus, information recorded on CD can be read by the use of output signals of photodetector PD. Incidentally, semiconductor lasers LD1-LD3 may also be housed in one package to constitute the so-called three-laser-one-package. In this case, a dichroic prism is not needed.

EXAMPLES

Preferred examples for the aforesaid embodiment will be explained below. Hereafter (including lens data in Tables), it is assumed that an exponent of 10 is expressed by using E (for example, $2.5 \times 10^{-3}$ is expressed by 2.5E-3).

The $5^{th}$ surface and the $8^{th}$ surface in each lens data in the following examples are virtual surfaces which do not exist actually. Further, the $10^{th}$ surface and the $10'^{th}$ surface are described as areas formed by dividing one surface into two areas at height h from the optical axis. The $10'^{th}$ surface means an area where height h satisfies 0 mm≦h<1.410 mm, while, the $10^{th}$ surface means an area where height h satisfies 1.410 mm≦h.

An optical surface of an objective optical system is formed to be an aspheric surface that is axial-symmetrical around the optical axis and is determined by a numerical expression obtained by assigning coefficients shown in each Table the expression of Numeral 1.

$$z=(y^2/\gamma)/[1+\sqrt{\{1-(k+1)(y/\gamma)^2\}}]+A_4 y^4+A_6 y^6+A_8 y^8+A_{10} y^{10}+A_{12} y^{12}+A_{14} y^{14}+A_{16} y^{16}+A_{18} y^{18}+A_{20} y^{20}$$ [Numeral 1]

In the above expression, z represents an aspheric surface form (distance in the optical axis direction from a plane that is tangent to the aspheric surface at its apex), y represents a distance from the optical axis, γ represents a radius of curvature, k represents a conic constant and each of $A_4, A_6, A_8, A_{10}, A_{12}, A_{14}, A_{16}, A_{18}$ and $A_{20}$ is an aspheric surface coefficient.

An optical path difference given to a light flux with each wavelength by the diffractive structure (phase structure) is determined by a numerical expression obtained by assigning coefficients shown in each Table to an optical path function of the expression of Numeral 2.

$$\phi = dor \times \lambda/\lambda_B \times (c_2 y^2 + c_4 y^4 + c_6 y^6 + c_8 y^8 + c_{10} y^{10})$$ [Numeral 2]

In the above expression, φ represents an optical path difference function, λ represents a wavelength of a light flux entering the diffractive structure, $\lambda_B$ represents a blaze wavelength, dor represents a diffraction order number of diffracted light used for recording/reproducing for optical disc, y represents a distance from the optical axis and each of $C_2, C_4, C_6, C_8$ and $C_{10}$ represents an optical path difference function coefficient.

Example 1

Lens data of Example 1 are shown in Table 1-Table 3.

TABLE 1

| | | | | Example 1 | | | | |
|---|---|---|---|---|---|---|---|---|
| $i^{th}$ surface | ri | di (406 nm) | ni (406 nm) | di (660 nm) | ni (660 nm) | di (783 nm) | ni (783 nm) | Optical element name |
| 0 | ∞ | 0.00 | | 0.00 | | 0.00 | | |
| 1 | ∞ | 5.75 | 1.6191 | 5.75 | 1.5772 | 5.75 | 1.5707 | Beam |
| 2 | ∞ | 11.26 | 1.0 | 11.26 | 1.0 | 11.26 | 1.0 | splitter |
| 3 | −6.3317 | 0.80 | 1.5586 | 0.80 | 1.5392 | 0.80 | 1.5359 | Two-lens |
| 4 | −11.3858 | 0.00 | 1.0 | −1.78 | 1.0 | −3.55 | 1.0 | coupling |
| 5 | ∞ | 4.80 | | 4.80 | | 4.80 | | lens |
| 6 | 36.4114 | 1.20 | 1.5586 | 1.20 | 1.5392 | 1.20 | 1.5359 | |
| 7 | −10.2957 | 0.00 | 1.0 | 1.55 | 1.0 | 3.63 | 1.0 | |
| 8 | ∞ | 13.00 | | 13.00 | | 13.00 | | |
| 9(Aperture diameter) | ∞ | 0.00 (φ3.019) | | 0.00 (φ3.019) | | 0.00 (φ2.52) | | |
| 10' | 1.9808 | 0.01183 | 1.5586 | 0.01183 | 1.5392 | 0.01183 | 1.5359 | Objective |
| 10 | 1.9847 | 1.76 | 1.5586 | 1.76 | 1.5392 | 1.76 | 1.5359 | lens |
| 11 | −17.9040 | 1.56 | 1.0 | 1.79 | 1.0 | 1.48 | 1.0 | |
| 12 | ∞ | 0.60 | 1.6191 | 0.60 | 1.5772 | 1.20 | 1.5707 | Disc |
| 13 | ∞ | 0.00 | 1.0 | 0.00 | 1.0 | 0.00 | 1.0 | |
| 14 | ∞ | 0.00 | | 0.00 | | 0.00 | | |

The symbol di' represents a distance from the $i^{th}$ surface to $i'^{th}$ surface

TABLE 2

Aspheric surface coefficient

3$^{rd}$ surface

| | |
|---|---|
| κ | −2.2204E+00 |
| A4 | −1.0498E−03 |

7$^{th}$ surface

| | |
|---|---|
| κ | −9.9929E−01 |
| A4 | 3.2122E−05 |

10$^{th}$ surface

| | |
|---|---|
| κ | −4.5733E−01 |
| A4 | −2.5665E−03 |
| A6 | 1.4742E−03 |
| A8 | −2.0698E−04 |
| A10 | −1.6688E−04 |
| A12 | 4.7170E−05 |
| A14 | −4.5460E−06 |

10$^{th}$ surface

| | |
|---|---|
| κ | −5.8288E−01 |
| A4 | 3.8986E−04 |
| A6 | 1.2242E−03 |
| A8 | −2.6497E−04 |
| A10 | −1.0160E−05 |
| A12 | 1.2852E−05 |
| A14 | −2.1055E−06 |

11$^{th}$ surface

| | |
|---|---|
| κ | −7.6549E+01 |
| A4 | 1.0264E−02 |
| A6 | −8.7197E−04 |
| A8 | −6.0952E−04 |
| A10 | 1.4882E−04 |

TABLE 2-continued

Aspheric surface coefficient

| | |
|---|---|
| A12 | −1.1987E−05 |
| A14 | 1.0733E−07 |

TABLE 3

7$^{th}$ surface
Optical path difference function
(HD DVD: 2$^{nd}$ order, DVD: 1$^{st}$ order, CD: 1$^{st}$ order)

| | |
|---|---|
| λB | 395 nm |
| C2 | −8.9791E−04 |

10$^{th}$ surface
Optical path difference function (DVD: 3$^{rd}$ order)

| | |
|---|---|
| λB | 660 nm |
| C2 | −7.1474E−04 |
| C4 | −1.1252E−03 |
| C6 | 2.2092E−04 |
| C8 | −7.9767E−05 |
| C10 | 9.0997E−06 |

10$^{th}$ surface
Optical path difference function
(HD DVD: 2$^{nd}$ order, DVD: 1$^{st}$ order, CD: 1$^{st}$ order)

| | |
|---|---|
| λB | 395 nm |
| C2 | −5.0000E−03 |
| C4 | −8.1736E−04 |
| C6 | 2.5881E−04 |
| C8 | −1.1772E−04 |
| C10 | 1.3932E−05 |

Example 2

Lens data of Example 2 are shown in Table 4-Table 6.

TABLE 4

Example 2

| i$^{th}$ surface | ri | di (406 nm) | ni (406 nm) | di (660 nm) | ni (660 nm) | di (783 nm) | ni (783 nm) | Optical element name |
|---|---|---|---|---|---|---|---|---|
| 0 | ∞ | 0.00 | | 0.00 | | 0.00 | | |
| 1 | ∞ | 5.75 | 1.6191 | 5.75 | 1.5772 | 5.75 | 1.5707 | Beam |
| 2 | ∞ | 12.28 | 1.0 | 12.28 | 1.0 | 12.28 | 1.0 | splitter |
| 3 | −7.0951 | 0.80 | 1.5586 | 0.80 | 1.5392 | 0.80 | 1.5359 | Two-lens |
| 4 | −16.6651 | 0.00 | 1.0 | −0.85 | 1.0 | −3.55 | 1.0 | coupling |
| 5 | ∞ | 4.80 | | 4.80 | | 4.80 | | lens |
| 6 | 66.3213 | 1.20 | 1.5586 | 1.20 | 1.5392 | 1.20 | 1.5359 | |
| 7 | −14.3835 | 0.00 | 1.0 | 0.67 | 1.0 | 3.63 | 1.0 | |
| 8 | ∞ | 20.70 | | 20.70 | | 20.70 | | |
| 9(Aperture diameter) | ∞ | 0.00 (φ3.019) | | 0.00 (φ3.019) | | 0.00 (φ2.52) | | |
| 10' | 1.9511 | 0.03127 | 1.5586 | 0.03127 | 1.5392 | 0.03127 | 1.5359 | Objective |
| 10 | 1.8632 | 1.76 | 1.5586 | 1.76 | 1.5392 | 1.76 | 1.5359 | lens |
| 11 | −12.0942 | 1.60 | 1.0 | 1.78 | 1.0 | 1.52 | 1.0 | |
| 12 | ∞ | 0.60 | 1.6191 | 0.60 | 1.5772 | 1.20 | 1.5707 | Disc |
| 13 | ∞ | 0.00 | 1.0 | 0.00 | 1.0 | 0.00 | 1.0 | |
| 14 | ∞ | 0.00 | | 0.00 | | 0.00 | | |

The symbol di' represents a distance from the i$^{th}$ surface to i$^{th}$ surface

TABLE 5

Aspheric surface coefficient

7$^{th}$ surface

| | |
|---|---|
| κ | −1.0014E+00 |
| A4 | 1.5121E−05 |

10'$^{th}$ surface

| | |
|---|---|
| κ | −4.2557E−01 |
| A4 | −1.1810E−03 |
| A6 | 1.6648E−03 |
| A8 | −1.9253E−04 |
| A10 | −1.6937E−04 |
| A12 | 4.6103E−05 |
| A14 | −4.9919E−06 |

10$^{th}$ surface

| | |
|---|---|
| κ | −5.9308E−01 |
| A4 | −3.0783E−04 |
| A6 | 1.5885E−03 |
| A8 | −3.7596E−04 |
| A10 | 1.0870E−05 |
| A12 | 1.0579E−05 |
| A14 | −1.9065E−06 |

11$^{th}$ surface

| | |
|---|---|
| κ | −5.2454E+01 |
| A4 | 9.7665E−03 |
| A6 | −8.4995E−04 |
| A8 | −5.4372E−04 |
| A10 | 1.4356E−04 |
| A12 | −1.3452E−05 |
| A14 | 3.2635E−07 |

TABLE 6

7$^{th}$ surface
Optical path difference function
(HD DVD: 2$^{nd}$ order, DVD: 1$^{st}$ order, CD: 1$^{st}$ order)

| | |
|---|---|
| λB | 395 nm |
| C2 | −6.4099E−03 |

10'$^{th}$ surface
Optical path difference function (DVD: 3$^{rd}$ order)

| | |
|---|---|
| λB | 660 nm |
| C2 | 2.4089E−03 |
| C4 | −7.6320E−04 |
| C6 | 2.4948E−04 |
| C8 | −8.1643E−05 |
| C10 | 7.8180E−06 |

10$^{th}$ surface
Optical path difference function
(HD DVD: 2$^{nd}$ order, DVD: 1$^{st}$ order, CD: 1$^{st}$ order)

| | |
|---|---|
| λB | 395 nm |
| C2 | 2.0000E−03 |
| C4 | −7.0920E−04 |
| C6 | 3.8180E−04 |
| C8 | −1.4861E−04 |
| C10 | 1.8106E−05 |

Example 3

Lens data of Example 3 are shown in Table 7-Table 9.

TABLE 7

Example 3

| i$^{th}$ surface | ri | di (408 nm) | ni (408 nm) | di (660 nm) | ni (660 nm) | di (784 nm) | ni (784 nm) | Optical element name |
|---|---|---|---|---|---|---|---|---|
| 0 | ∞ | 0.00 | | 0.00 | | 0.00 | | |
| 1 | ∞ | 5.75 | 1.6191 | 5.75 | 1.5772 | 5.75 | 1.5707 | Beam |
| 2 | ∞ | 6.87 | 1.0 | 6.87 | 1.0 | 6.87 | 1.0 | splitter |
| 3 | −3.0238 | 0.80 | 1.5583 | 0.80 | 1.5392 | 0.80 | 1.5359 | Two-lens |
| 4 | −7.7844 | 0.00 | 1.0 | 0.07 | 1.0 | −1.81 | 1.0 | coupling |
| 5 | ∞ | 2.30 | | 2.30 | | 2.30 | | lens |
| 6 | 21.5756 | 1.20 | 1.5583 | 1.20 | 1.5392 | 1.20 | 1.5359 | |
| 7 | −5.2960 | 0.00 | 1.0 | −0.18 | 1.0 | 1.94 | 1.0 | |
| 8 | ∞ | 9.00 | | 9.00 | | 9.00 | | |
| 9(Aperture diameter) | ∞ | 0.00 (φ3.019) | | 0.00 (φ3.019) | | 0.00 (φ2.52) | | |
| 10' | 1.5372 | 0.00012 | 1.5583 | 0.00012 | 1.5392 | 0.00012 | 1.5359 | Objective |
| 10 | 1.5372 | 1.37 | 1.5583 | 1.37 | 1.5392 | 1.37 | 1.5359 | lens |
| 11 | −11.5320 | 1.01 | 1.0 | 1.12 | 1.0 | 0.88 | 1.0 | |
| 12 | ∞ | 0.60 | 1.6183 | 0.60 | 1.5772 | 1.20 | 1.5707 | Disc |
| 13 | ∞ | 0.00 | 1.0 | 0.00 | 1.0 | 0.00 | 1.0 | |
| 14 | ∞ | 0.00 | | 0.00 | | 0.00 | | |

The symbol di' represents a distance from the i$^{th}$ surface to i$^{th}$ surface

TABLE 8

Aspheric surface coefficient

3rd surface

| | |
|---|---|
| κ | −1.0430E+00 |
| A4 | −4.4528E−03 |
| A6 | −1.8382E−04 |

7th surface

| | |
|---|---|
| κ | −1.6498E+00 |
| A4 | −5.0795E−04 |
| A6 | 1.3927E−05 |

10th surface

| | |
|---|---|
| κ | −5.1699E−01 |
| A4 | 3.5146E−03 |
| A6 | 3.0282E−03 |
| A8 | 3.8906E−04 |
| A10 | −1.6738E−03 |
| A12 | 1.0196E−03 |
| A14 | −2.3934E−04 |

10th surface

| | |
|---|---|
| κ | −5.1699E−01 |
| A4 | 3.5146E−03 |
| A6 | 3.0282E−03 |
| A8 | 3.8906E−04 |
| A10 | −1.6738E−03 |
| A12 | 1.0196E−03 |
| A14 | −2.3934E−04 |

11th surface

| | |
|---|---|
| κ | −1.9998E+01 |
| A4 | 2.6860E−02 |
| A6 | −5.0305E−03 |
| A8 | −4.3528E−03 |
| A10 | 1.8352E−03 |

TABLE 8-continued

Aspheric surface coefficient

| | |
|---|---|
| A12 | −2.9041E−04 |
| A14 | 1.2725E−05 |

TABLE 9

7th surface
Optical path difference function
(HD DVD: 2nd order, DVD: 1st order, CD: 1st order)

| | |
|---|---|
| λB | 395 nm |
| C2 | −6.0000E−04 |

10'th surface
Optical path difference function (DVD: 3rd order)

| | |
|---|---|
| λB | 660 nm |
| C2 | −5.4396E−03 |
| C4 | −4.3707E−04 |
| C6 | 3.8874E−04 |
| C8 | −3.0295E−04 |
| C10 | 6.7966E−05 |

10th surface
Optical path difference function
(HD DVD: 2nd order, DVD: 1st order, CD: 1st order)

| | |
|---|---|
| λB | 395 nm |
| C2 | −9.7666E−03 |
| C4 | −7.8474E−04 |
| C6 | 6.9796E−04 |
| C8 | −5.4394E−04 |
| C10 | 1.2203E−04 |

Example 4

Lens data of Example 4 are shown in Table 10-Table 12.

TABLE 10

Example 4

| $i^{th}$ surface | ri | di (408 nm) | ni (408 nm) | di (660 nm) | ni (660 nm) | di (784 nm) | ni (784 nm) | Optical element name |
|---|---|---|---|---|---|---|---|---|
| 0 | ∞ | 0.00 | | 0.00 | | 0.00 | | |
| 1 | ∞ | 5.75 | 1.6191 | 5.75 | 1.5772 | 5.75 | 1.5707 | Beam |
| 2 | ∞ | 6.19 | 1.0 | 6.19 | 1.0 | 6.19 | 1.0 | splitter |
| 3 | −3.4056 | 0.80 | 1.5583 | 0.80 | 1.5392 | 0.80 | 1.5359 | Two-lens |
| 4 | −6.2060 | 0.00 | 1.0 | 0.45 | 1.0 | −3.49 | 1.0 | coupling |
| 5 | ∞ | 4.70 | | 4.70 | | 4.70 | | lens |
| 6 | 72.0824 | 1.20 | 1.5583 | 1.20 | 1.5392 | 1.20 | 1.5359 | |
| 7 | −9.3140 | 0.00 | 1.0 | −0.54 | 1.0 | 3.62 | 1.0 | |
| 8 | ∞ | 13.70 | | 13.70 | | 13.70 | | |
| 9(Aperture diameter) | ∞ | 0.00 (φ3.019) | | 0.00 (φ3.019) | | 0.00 (φ2.52) | | |
| 10' | 1.5094 | 0.01769 | 1.5583 | 0.01769 | 1.5392 | 0.01769 | 1.5359 | Objective |
| 10 | 1.4346 | 1.37 | 1.5583 | 1.37 | 1.5392 | 1.37 | 1.5359 | lens |
| 11 | −8.0506 | 1.03 | 1.0 | 1.12 | 1.0 | 0.90 | 1.0 | |
| 12 | ∞ | 0.60 | 1.6183 | 0.60 | 1.5772 | 1.20 | 1.5707 | Disc |
| 13 | ∞ | 0.00 | 1.0 | 0.00 | 1.0 | 0.00 | 1.0 | |
| 14 | ∞ | 0.00 | | 0.00 | | 0.00 | | |

The symbol di' represents a distance from the $i^{th}$ surface to $i^{th}$ surface

TABLE 11

Aspheric surface coefficient

*3rd surface*

| | |
|---|---|
| κ | −8.8878E−01 |
| A4 | −2.7665E−03 |
| A6 | −1.4298E−04 |

*7th surface*

| | |
|---|---|
| κ | −2.7080E+00 |
| A4 | −2.9184E−04 |
| A6 | 2.7553E−06 |

*10th surface*

| | |
|---|---|
| κ | −4.7277E−01 |
| A4 | 8.6546E−03 |

TABLE 11-continued

Aspheric surface coefficient

| | |
|---|---|
| A6 | 4.2994E−03 |
| A8 | 3.7199E−04 |
| A10 | −1.8676E−03 |
| A12 | 9.0899E−04 |
| A14 | −2.6354E−04 |

*10th surface*

| | |
|---|---|
| κ | −5.8539E−01 |
| A4 | 5.7072E−03 |
| A6 | 9.8369E−04 |
| A8 | 2.7092E−03 |
| A10 | −2.6766E−03 |
| A12 | 1.5051E−03 |
| A14 | −3.7321E−04 |

*11th surface*

| | |
|---|---|
| κ | −1.3505E+01 |
| A4 | 2.9818E−02 |
| A6 | −3.7632E−03 |
| A8 | −4.8943E−03 |
| A10 | 1.3993E−03 |
| A12 | 5.9105E−05 |
| A14 | −6.8103E−05 |

TABLE 12

*7th surface*
Optical path difference function
(HD DVD: $2^{nd}$ order, DVD: $1^{st}$ order, CD: $1^{st}$ order)

| | |
|---|---|
| λB | 395 nm |
| C2 | −7.1000E−03 |

TABLE 12-continued

*10th surface*
Optical path difference function (DVD: $3^{rd}$ order)

| | |
|---|---|
| λB | 660 nm |
| C2 | −3.5457E−04 |
| C4 | 6.5693E−04 |
| C6 | 5.2938E−04 |
| C8 | −3.5057E−04 |
| C10 | 7.2217E−06 |

Lens data of Example 5 are shown in Table 13-Table 15. In the present example, a coupling lens is constructed by a single lens with refractive surfaces, and compatibility between HD and DVD is carried out by movement of the coupling lens.

TABLE 13

Example 5

| $i^{th}$ surface | ri | di (408 nm) | ni (408 nm) | di (660 nm) | ni (660 nm) | Optical element name |
|---|---|---|---|---|---|---|
| 0 | ∞ | 19.31 | | 19.51 | | |
| 1 | 14.4659 | 1.50 | 1.5583 | 1.50 | 1.5392 | Single lens |
| 2 | −19.1485 | 13.00 | 1.0 | 12.69 | 1.0 | coupling lens |
| 3(Aperture diameter) | ∞ | 0.00 (φ3.037) | | 0.00 (φ3.037) | | |
| 4' | 1.5372 | 0.00012 | 1.5583 | 0.00012 | 1.5392 | Objective lens |
| 4 | 1.5372 | 1.37 | 1.5583 | 1.37 | 1.5392 | |
| 5 | −11.5320 | 1.01 | 1.0 | 1.12 | 1.0 | |
| 6 | ∞ | 0.60 | 1.6183 | 0.60 | 1.5772 | Disc |
| 7 | ∞ | 0.00 | 1.0 | 0.00 | 1.0 | |
| 8 | ∞ | 0.00 | | 0.00 | | |

The symbol di' represents a distance from the $i^{th}$ surface to $i^{th}$ surface

TABLE 14

Aspheric surface coefficient

*2nd surface*

| | |
|---|---|
| κ | 1.6803E−04 |

*4th surface 1.409 mm ≦ h*

| | |
|---|---|
| κ | −5.1699E−01 |
| A4 | 3.5146E−03 |
| A6 | 3.0282E−03 |
| A8 | 3.8906E−04 |
| A10 | −1.6738E−03 |
| A12 | 1.0196E−03 |
| A14 | −2.3934E−04 |

*4th surface 0 mm ≦ h < 1.409 mm*

| | |
|---|---|
| κ | −5.1699E−01 |
| A4 | 3.5146E−03 |
| A6 | 3.0282E−03 |
| A8 | 3.8906E−04 |
| A10 | −1.6738E−03 |
| A12 | 1.0196E−03 |
| A14 | −2.3934E−04 |

*5th surface*

| | |
|---|---|
| κ | −1.9998E+01 |
| A4 | 2.6860E−02 |
| A6 | −5.0305E−03 |
| A8 | −4.3528E−03 |
| A10 | 1.8352E−03 |
| A12 | −2.9041E−04 |
| A14 | 1.2725E−05 |

TABLE 15

4$^{th}$ surface
Optical path difference function (DVD: 3$^{rd}$ order)

| | |
|---|---|
| λB | 660 nm |
| C2 | −5.4396E−03 |
| C4 | −4.3707E−04 |
| C6 | 3.8874E−04 |
| C8 | −3.0295E−04 |
| C10 | 6.7966E−05 |

4$^{th}$ surface
Optical path difference function
(HD DVD: 2$^{nd}$ order, DVD: 1$^{st}$ order, CD: 1$^{st}$ order)

| | |
|---|---|
| λB | 395 nm |
| C2 | −9.7666E−03 |
| C4 | −7.8474E−04 |
| C6 | 6.9796E−04 |
| C8 | −5.4394E−04 |
| C10 | 1.2203E−04 |

Lens data of Example 6 are shown in Table 16-Table 18. In the present example, a coupling lens is constructed by a single lens including a diffractive surface, and compatibility between HD and DVD is carried out by changing an angle of light flux outgoing from the coupling lens due to its diffraction.

TABLE 16

Example 6

| i$^{th}$ surface | ri | di (408 nm) | ni (408 nm) | di (660 nm) | ni (660 nm) | Optical element name |
|---|---|---|---|---|---|---|
| 0 | ∞ | 19.31 | | 19.31 | | |
| 1 | 14.3862 | 1.50 | 1.5583 | 1.50 | 1.5392 | Single lens |
| 2 | −17.8730 | 13.00 | 1.0 | 12.89 | 1.0 | coupling lens |
| 3(Aperture diameter) | ∞ | 0.00 (φ3.037) | | 0.00 (φ3.037) | | |
| 4' | 1.5372 | 0.00012 | 1.5583 | 0.00012 | 1.5392 | Objective lens |
| 4 | 1.5372 | 1.37 | 1.5583 | 1.37 | 1.5392 | |
| 5 | −11.5320 | 1.01 | 1.0 | 1.12 | 1.0 | |
| 6 | ∞ | 0.60 | 1.6183 | 0.60 | 1.5772 | Disc |
| 7 | ∞ | 0.00 | 1.0 | 0.00 | 1.0 | |
| 8 | ∞ | 0.00 | | 0.00 | | |

The symbol di' represents a distance from the i$^{th}$ surface to i$^{th}$ surface

TABLE 17

Aspheric surface coefficient

2$^{nd}$ surface

| | |
|---|---|
| A4 | 1.7386E−04 |

4$^{th}$ surface 1.409 mm ≦ h

| | |
|---|---|
| κ | −5.1699E−01 |
| A4 | 3.5146E−03 |
| A6 | 3.0282E−03 |
| A8 | 3.8906E−04 |
| A10 | −1.6738E−03 |
| A12 | 1.0196E−03 |
| A14 | −2.3934E−04 |

4$^{th}$ surface 0 mm ≦ h < 1.409 mm

| | |
|---|---|
| κ | −5.1699E−01 |
| A4 | 3.5146E−03 |
| A6 | 3.0282E−03 |
| A8 | 3.8906E−04 |
| A10 | −1.6738E−03 |
| A12 | 1.0196E−03 |
| A14 | −2.3934E−04 |

5$^{th}$ surface

| | |
|---|---|
| κ | −1.9998E+01 |
| A4 | 2.6860E−02 |

TABLE 17-continued

Aspheric surface coefficient

| | |
|---|---|
| A6 | −5.0305E−03 |
| A8 | −4.3528E−03 |
| A10 | 1.8352E−03 |
| A12 | −2.9041E−04 |
| A14 | 1.2725E−05 |

TABLE 18

2$^{nd}$ surface
Optical path difference function
(HD DVD: 2$^{nd}$ order, DVD: 1$^{st}$ order)

| | |
|---|---|
| λB | 408 mm |
| C2 | 5.7420E−04 |

4$^{th}$ surface
Optical path difference function (DVD: 3$^{rd}$ order)

| | |
|---|---|
| λB | 660 mm |
| C2 | −5.4396E−03 |

TABLE 18-continued

| | |
|---|---|
| C8 | −3.0295E−04 |
| C10 | 6.7966E−05 |

4$^{th}$ surface
Optical path difference function
(HD DVD: 2$^{nd}$ order, DVD: 1$^{st}$ order, CD: 1$^{st}$ order)

| | |
|---|---|
| C4 | −4.3707E−04 |
| C6 | 3.8874E−04 |
| λB | 395 nm |
| C2 | −9.7666E−03 |
| C4 | −7.8474E−04 |
| C6 | 6.9796E−04 |
| C8 | −5.4394E−04 |
| C10 | 1.2203E−04 |

Values relating to Examples 1 to 6 are shown collectively in Table 19 and Table 20.

TABLE 19

|  |  |  | Example 1 | Example 2 | Example 3 | Example 4 |
|---|---|---|---|---|---|---|
| HD | Complex optical system | Magnification | −0.141 | −0.141 | −0.143 | −0.141 |
|  |  | Chromatic aberration [μm/nm] | 0.07 | 0.05 | 0.06 | 0.06 |
|  | Coupling lens | Focal length [mm] | 18.70 | 20.04 | 12.67 | 13.72 |
|  |  | Chromatic aberration [μm/nm] | 3.90 | −39.02 | 6.27 | −23.12 |
|  | Objective lens | Focal length [mm] | 3.10 | 3.10 | 2.30 | 2.30 |
|  |  | NA | 0.65 | 0.65 | 0.65 | 0.65 |
|  |  | Magnification | 0.035 | 0.035 | 0.045 | 0.005 |
|  |  | Chromatic aberration [μm/nm] | 0.00 | 0.73 | −0.07 | 0.46 |
| DVD | Complex optical system | Magnification | −0.149 | −0.128 | −0.146 | −0.132 |
|  |  | Chromatic aberration [μm/nm] | −0.24 | −0.09 | −0.14 | −0.09 |
|  | Coupling lens | Focal length $f_{1\cdot CPL}$ [mm] | 21.77 | 24.97 | 13.49 | 16.00 |
|  |  | Chromatic aberration [μm/nm] | −0.79 | −19.09 | 0.80 | 0.75 |
|  | Objective lens | Focal length $f_{1\cdot OBL}$ [mm] | 3.24 | 3.20 | 2.41 | 2.38 |
|  |  | NA | 0.65 | 0.65 | 0.65 | 0.65 |
|  |  | Magnification | 0.000 | 0.000 | 0.040 | 0.032 |
|  |  | Chromatic aberration [μm/nm] | −0.22 | 0.17 | −0.15 | 0.11 |
| CD | Complex optical system | Magnification | −0.150 | −0.128 | −0.146 | −0.131 |
|  |  | Chromatic aberration [μm/nm] | −0.28 | −0.05 | −0.23 | −0.04 |
|  | Coupling lens | Focal length $f_{2\cdot CPL}$ [mm] | 23.94 | 27.30 | 19.71 | 20.96 |
|  |  | Chromatic aberration [μm/nm] | −1.11 | −13.22 | 0.17 | −0.17 |
|  | Objective lens | Focal length [mm] | 3.23 | 3.23 | 2.39 | 2.39 |
|  |  | NA | 0.51 | 0.51 | 0.51 | 0.51 |
|  |  | Magnification | −0.027 | −0.029 | −0.032 | −0.033 |
|  |  | Chromatic aberration [μm/nm] | −0.25 | 0.13 | −0.23 | 0.07 |
| Others |  | Objective lens dOBL [μm] | 1.58 | 1.52 | 1.58 |  |
|  |  | Coupling lens dCPL [μm] (Average in effective diameter) | 1.42 | 1.65 | 1.46 | 1.43 |
|  |  | $(f_{1\cdot CPL}/f_{2\cdot CPL}) \times 1/f_{1\cdot OBL}$ | 0.28 | 0.29 | 0.28 | 0.32 |
|  |  | Distance between coupling lens and objective lens L' [mm] | 13.00 | 20.70 | 9.00 | 13.70 |
|  |  | Power difference of coupling lens $1/f_{1\cdot CPL} - 1/f_{2\cdot CPL}$ | 0.004 | 0.003 | 0.023 | 0.015 |
|  |  | Movement distance for compatibility of HD/DVD Dt1 [mm] | 1.78 | 0.85 | 0.07 | 0.45 |
|  |  | Movement distance for compatibility of HD/CD Dt2 [mm] | 3.55 | 3.55 | 1.81 | 3.49 |

TABLE 20

|  |  |  | Example 5 | Example 6 |
|---|---|---|---|---|
| HD | Complex optical system | Magnification | −0.142 | −0.142 |
|  |  | Chromatic aberration [μm/nm] | 0.07 | 0.12 |
|  | Coupling lens | Focal length [mm] | 15.00 | 15.00 |
|  |  | Chromatic aberration [μm/nm] | 9.96 | −39.02 |
|  | Objective lens | Focal length [mm] | 3.10 | 3.10 |
|  |  | NA | 0.65 | 0.65 |
|  |  | Magnification | 0.035 | 0.035 |
|  |  | Chromatic aberration [μm/nm] | 0.00 | 0.73 |
| DVD | Complex optical system | Magnification | −0.144 | −0.145 |
|  |  | Chromatic aberration [μm/nm] | −0.13 | −0.11 |
|  | Coupling lens | Focal length $f_{1\cdot CPL}$ [mm] | 15.53 | 15.44 |
|  |  | Chromatic aberration [μm/nm] | 1.59 | 2.71 |
|  | Objective lens | Focal length $f_{1\cdot OBL}$ [mm] | 3.24 | 3.20 |
|  |  | NA | 0.65 | 0.65 |
|  |  | Magnification | 0.000 | 0.000 |
|  |  | Chromatic aberration [μm/nm] | −0.22 | 0.17 |
| Others |  | Objective lens dOBL [μm] | 1.58 | 1.52 |
|  |  | Coupling lens dCPL [μm] (Average in effective diameter) |  | 1.46 |
|  |  | $(f_{1\cdot CPL}/f_{2\cdot CPL}) \times 1/f_{1\cdot OBL}$ | 0.30 | 0.30 |
|  |  | Distance between coupling lens and objective lens L' [mm] | 13.00 | 13.00 |
|  |  | Power difference of coupling lens $1/f_{1\cdot CPL} - 1/f_{2\cdot CPL}$ | 0.002 | 0.002 |
|  |  | Movement distance for Compatibility of HD/DVD Dt1 [mm] | 0.20 | 0.00 |

A blank of dOBL of the objective lens in Example 4 means that the objective lens is made up of a refractive surface, and a blank of dCPL of the coupling lens in Example 5 means that the coupling lens is made up of a refractive surface.

The invention claimed is:

1. An optical pickup apparatus comprising:

a first light source emitting a light flux with a wavelength λ1 (nm);

a second light source emitting a light flux with a wavelength λ2 (nm), where λ1<λ2;

a light-converging optical system comprising a coupling lens and an objective lens; and a photodetector, wherein the optical pickup apparatus is capable of recording and/or reproducing information by converging a light flux from the first light source with the light-converging optical system on an information recording surface of a first optical information recording medium through a protective layer with a thickness of t1, and by detecting a reflected light flux from the information recording surface of the first optical information recording medium on the photodetector after the reflected light flux from the information recording surface of the first optical information recording medium passes through the light-converging optical system again, wherein the optical apparatus is capable of recording and/or reproducing information by converging a light flux from the second light source with the light-converging optical system on an information recording surface of a second optical information recording medium through a protective layer with a thickness of t2 (t1≦t2), and by detecting a reflected light flux from the information recording surface of the second optical information recording medium on the photodetector when the reflected light flux from the information recording surface of the second optical information recording medium passes through the light-converging system again, and wherein the optical pickup apparatus satisfies following expressions (1), (2), and (3):

$$0 \leq |L1-L2| \leq 0.5 \quad (1)$$

$$0.01 < m1-m2 \quad (2)$$

$$0 \leq |M1-M2| \leq 0.1 \quad (3)$$

where L1 (mm) is an optical path length from the first light source to a surface facing the first light source in the first optical information recording medium, L2 (mm) is an optical path length from the second light source to a surface facing the second light source in the second optical information recording medium, m1 is an optical system magnification of the objective lens when information for the first optical information recording medium is recorded and/or reproduced, m2 is an optical system magnification of the objective lens when information for the second optical information recording medium is recorded and/or reproduced, M1 is a total optical system magnification of the light-converging optical system when information for the first optical information recording medium is recorded and/or reproduced, and M2 is a total optical system magnification of the light-converging optical system when information for the second optical information recording medium is recorded and/or reproduced.

2. The optical pickup apparatus of claim 1, wherein a power of the coupling lens for a light flux with the wavelength λ1 and a power of the coupling lens for a light flux with the wavelength λ2 are different from each other.

3. The optical pickup apparatus of claim 1, wherein the coupling lens comprises a first diffractive structure, and the light flux with the wavelength λ1 and the light flux with the wavelength λ2 pass the first diffractive structure.

4. The optical pickup apparatus of claim 3, wherein the first diffractive structure has a function which controls a generation of a chromatic aberration at least for the light flux with the wavelength λ1.

5. The optical pickup apparatus of claim 4, wherein the first diffractive structure comprises a plurality of steps whose average step amount dCPL (μm) along an optical axis satisfies a following expression (4):

$$\lambda 1 \times 2/(n1-1) \times 1.0 \leq dCPL \leq \lambda 1 \times 2/(n1-1) \times 1.3 \quad (4)$$

where n1 is a refractive index of a material forming the first diffractive structure for the light flux with the wavelength λ1.

6. The optical pickup apparatus of claim 3, wherein the first diffractive structure has a function which makes a difference between an optical system magnification of the coupling lens for the light flux with the wavelength λ1 and an optical system magnification of the coupling lens for the light flux with the wavelength λ2.

7. The optical pickup apparatus of claim 1, wherein the coupling lens comprises a lens movable in a direction of an optical axis.

8. The optical pickup apparatus of claim 1, wherein the coupling lens comprises a plurality of lenses including at least one lens located different position along an optical axis between when information of the first optical information recording medium is recorded and/or reproduced and when information of the second optical information recording medium is recorded and/or reproduced.

9. The optical pickup apparatus of claim 6, wherein the coupling lens consists of two lenses.

10. The optical pickup apparatus of claim 9, wherein one of the two lenses of the coupling lens is movable along the optical axis and satisfies a following expression (5):

$$0.25 \leq (f_{1 \cdot CPL}/f_{2 \cdot CPL}) \times 1/f_{1 \cdot OBL} \leq 0.35 \quad (5)$$

where $f_{1 \cdot CPL}$ (mm) is a focal length of the coupling lens for the light flux with the wavelength λ1, $f_{2 \cdot CPL}$ (mm) is a focal length of the coupling lens for the light flux with the wavelength λ2, and $f_{1 \cdot OBL}$ (mm) is a focal length of the objective lens for the light flux with the wavelength λ1.

11. The optical pickup apparatus of claim 7, wherein the wavelength λ1, the wavelength λ2, and a displacement amount of the coupling lens Dt1 (mm) satisfy following expressions:

$$350 \leq \lambda 1 \leq 450 \quad (6)$$

$$600 \leq \lambda 2 \leq 700 \quad (7)$$

$$0.3 \leq Dt1 \leq 2 \quad (8).$$

12. The optical pickup apparatus of claim 7,
wherein the wavelength λ1, the wavelength λ2, and a displacement amount of the coupling lens Dt2 (mm) satisfy following expressions:

$$350 \leq \lambda1 \leq 450 \quad (9)$$

$$700 \leq \lambda2 \leq 800 \quad (10)$$

$$1 \leq Dt1 \leq 4 \quad (11).$$

13. The optical pickup apparatus of claim 1 further comprising:
a third light source emitting a light flux with a wavelength λ3 (nm), where λ2<λ3,
wherein the optical pickup apparatus is capable of recording and/or reproducing information by converging a light flux from the third light source with the light-converging optical system on an information recording surface of a third optical information recording medium through a protective layer with a thickness of t3 (t2<t3), and by detecting a reflected light flux from the information recording surface of the third optical information recording medium on the photodetector after the reflected light flux from the information recording surface of the second optical information recording medium passes through the light-converging optical system again, and
wherein the objective lens comprises a second diffractive structure,
the light flux with the wavelength λ1 and the light flux with the wavelength λ2 passes through the second diffractive structure, and
the second diffractive structure comprises a plurality of steps whose average step amount dOBL (μm) along an optical axis satisfies a following expression (12):

$$\lambda1 \times 2/(n2-1) \times 1.0 \leq dOBL \leq \lambda1 \times 2/(n2-1) \times 1.3 \quad (12)$$

where n2 is a refractive index of a material forming the second diffractive structure for the light flux with the wavelength λ1.

14. The optical pickup apparatus of claim 1,
wherein the optical pickup apparatus satisfies a following expression (13):

$$10 \leq L' \leq 25 \quad (13)$$

where L' (mm) is a distance (air space along an optical axis) for the light flux with the wavelength λ1 between the coupling lens and the objective lens.

15. The optical pickup apparatus of claim 1,
wherein the optical pickup apparatus further comprises a branching device branching away a light flux traveling from each of the first and second optical information recording media to the photodetector from a light flux traveling from each of the first and second light sources to each of the first and second information recording media, and the coupling lens is arranged between the objective lens and the branching device.

16. The optical pickup apparatus of claim 1,
wherein the photodetector consists of one element body comprising light-receiving sections, and
the photodetector receives at least the light flux with the wavelength λ1 and the light flux with the wavelength λ2 at light-receiving sections arranged at a same position.

17. The optical pickup apparatus of claim 1,
wherein the optical pickup apparatus satisfies a following expression:

$$|NA1-NA2| \leq 0.05,$$

where NA1 is a numerical aperture at an image side of the objective lens when information is recorded and/or reproduced for the first optical information recording medium, and
NA2 is a numerical aperture at an image side of the objective lens when information is recorded and/or reproduced for the second optical information recording medium.

18. The optical pickup apparatus of claim 1,
wherein the first optical information recording medium is HD DVD and the second optical information recording medium is DVD.

19. The optical pickup apparatus of claim 8,
wherein the wavelength λ1, the wavelength λ2, and a displacement amount of the coupling lens Dt1 (mm) satisfy following expressions:

$$350 \leq \lambda1 \leq 450 \quad (6)$$

$$600 \leq \lambda2 \leq 700 \quad (7)$$

$$0.3 \leq Dt1 \leq 2 \quad (8).$$

20. The optical pickup apparatus of claim 10,
wherein the wavelength λ1, the wavelength λ2, and a displacement amount of the coupling lens Dt1 (mm) satisfy following expressions:

$$350 \leq \lambda1 \leq 450 \quad (6)$$

$$600 \leq \lambda2 \leq 700 \quad (7)$$

$$0.3 \leq Dt1 \leq 2 \quad (8).$$

21. The optical pickup apparatus of claim 8,
wherein the wavelength λ1, the wavelength λ2, and a displacement amount of the coupling lens Dt2 (mm) satisfy following expressions:

$$700 \leq \lambda2 \leq 800 \quad (10)$$

$$1 \leq Dt1 \leq 4 \quad (11).$$

22. The optical pickup apparatus of claim 10,
wherein the wavelength λ1, the wavelength λ2, and a displacement amount of the coupling lens Dt2 (mm) satisfy following expressions:

$$350 \leq \lambda1 \leq 450 \quad (9)$$

$$700 \leq \lambda2 \leq 800 \quad (10)$$

$$1 \leq Dt1 \leq 4 \quad (11).$$

* * * * *